T. OLSEN.
Testing-Machine.
No. 212,107.  Patented Feb. 11, 1879.
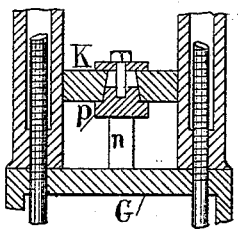
Fig. IIII
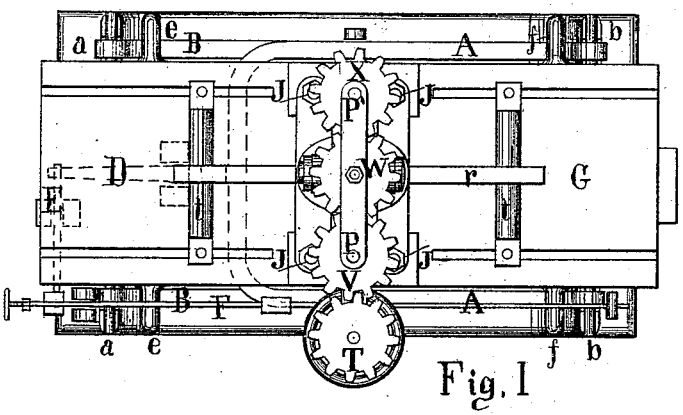
Fig. I
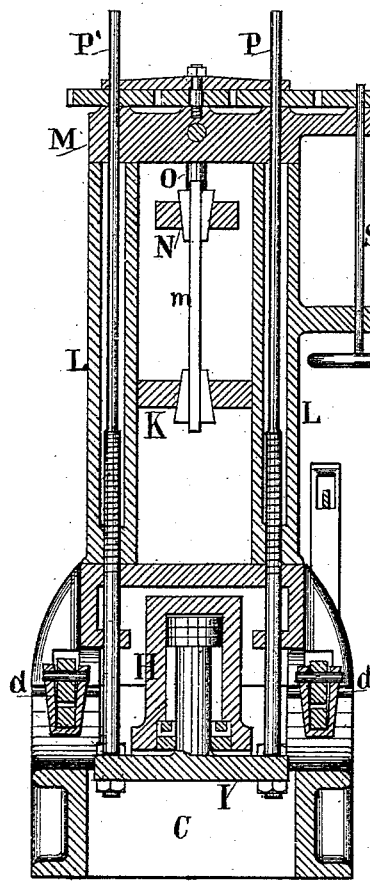
Fig. III
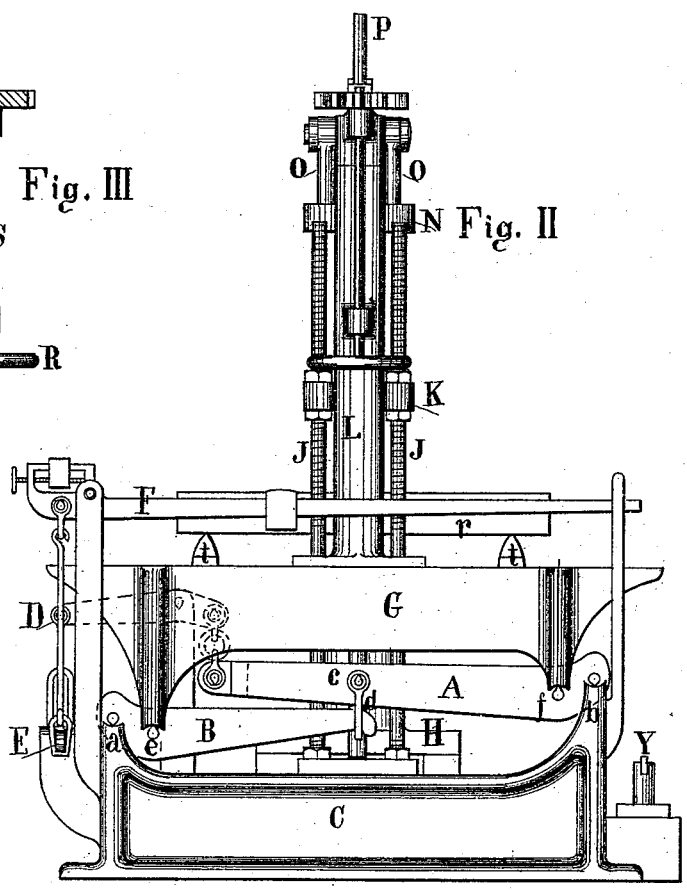
Fig. II
Witnesses.
J. N. DeHaven.
Chas. Robson
Inventor.
Tinius Olsen

UNITED STATES PATENT OFFICE.

TINIUS OLSEN, OF PHILADELPHIA, PENNSYLVANIA.

IMPROVEMENT IN TESTING-MACHINES.

Specification forming part of Letters Patent No. 212,107, dated February 11, 1879; application filed October 25, 1878.

*To all whom it may concern:*

Be it known that I, TINIUS OLSEN, of the city and county of Philadelphia, and State of Pennsylvania, have invented a new and useful Improvement in Testing-Machines, of which the following is a specification:

The invention relates more particularly to testing-machines in which a hydraulic jack is used for exerting the strain, and in which the strain is in a vertical direction.

Heretofore such machines known as the "vertical testing-machines" have been principally constructed for small specimens of the different materials the quality of which is to be tested, and not been applicable to testing materials in the original shape and size in which they are used in practice, which is often desirable.

The object of my invention is to make and arrange the weighing and pulling or strain-exerting device in such a manner that any size and form as most usually employed in practice can be subjected to either tensile, compression, or transverse strains, as the case may require; and, further, it is to have the strain act on the specimen placed as it is most commonly placed and acted upon in practice.

The invention consists in the arrangement of a platform and a weighing device, in combination with a hydraulic jack.

It also consists in an adjustable cross-head, in combination with the hydraulic jack; and, finally, in an arrangement for working the screws for holding the strain on the specimen and indicating extension, compression, and deflection.

In the accompanying drawings, in which similar letters of reference indicate like parts in all figures, Figure I is a plan. Fig. II is an elevated side view; Fig. III, an end elevation, in section, through the center; Fig. IIII, details, in section, showing arrangement for compression.

The main levers A and B, Figs. I and II, are supported at the pivots $a$ and $b$ on the projections of the main frame C. Lever A is double armed, and the two levers B, one on each side, are connected to lever A at $c$ by a clevis, $d$. Any strain or weight brought to bear on the pivots $e$ and $f$ of levers A and B is by proper connections transmitted through levers D and E to the weighing-beam F, where it is balanced and indicated as on an ordinary platform-scale.

On the pivots $e$ and $f$ of the levers A and B rests a frame or platform, G, which will receive the strain to which any specimen may be subjected in the machine, and communicate the same through the system of levers to the weighing-beam. On the top of frame C, and inside of platform G, is a hydraulic jack, H. The plunger of same, with its cross-head I, is working and guided inside the frame C. In the cross-head I are secured four bolts, J. At equal distances from the center of the jack the bolts are extended up through the platform G, above which they hold a cross-head, K, in position, and, being threaded all the distance above the platform, the cross-head K can be adjusted to any desired position up and down by nuts on each side of same. By the motion up or down of the plunger and cross-head I the cross-head K is moved in a like manner.

On top of platform G, on each side, and centrally to the hydraulic jack, are two columns, L, which guide the cross-head K and support the top cross-head M, from which is suspended by rods O the tool N. To this tool N the upper end of the specimen is secured that is to be subjected to tensile strain. In columns L are the partly-threaded rods P, for holding the pressure put upon the test specimen for any desired length of time, and also for ascertaining the extension, compression, or deflection of the specimen being tested. The depression caused by the extension, compression, or deflection of the specimen gives a corresponding downward motion to the cross-head I, and the lower ends of the rods P can at any time be placed on the cross-head I by means of the hand-wheel R, which is in a convenient position for the operator. The downward motion, therefore, which can be given to rods P is greatly multiplied, and by suitable division on the periphery of the hand-wheel the amount can readily be ascertained. The hand-wheel R and shaft S are supported by bearings projecting from the column L and cross-head M.

To the top of shaft S is secured the gear-wheel T, which gears into the gear V, which is secured to rod P. This again gears into an idler, W, which gears into the wheel X, secured to the rod P'. By this arrangement any motion that is given to rod P is also given to P'. Y is the pump for supplying the fluid to the hydraulic jack H.

The operation of the machine will be as follows: For making a tensile test the specimen $m$ is secured in the suspended block or top tool N, Fig. III. The lower end is then secured in the cross-head K, which previously has been adjusted to the proper height to suit the length of the specimen on the screws or rods J. The fluid is then forced into the jack on top of the plunger or piston, which will cause the same to descend, and also the cross-head K, which is connected to it by the rods J, and cause a strain on the specimen, the upper end of the specimen being secured in the tool N, which, through cross-head M, columns L, and platform G, will transmit the same through the system of levers, and be indicated on beam F.

For making compression test the operation will be as follows: The lower end of the specimen $n$, Fig. IIII, is placed upon the platform G. Under cross-head K is secured a block, $p$, with surface parallel to the top of platform G. In making the cross-head K descend, as for making tensile tests, the strain upon the specimen is directly transmitted through the same to the platform G, and by that through the levers to the beam F, and there indicated.

In making transverse tests, the specimen $r$, Figs. II and III, to be tested is placed upon blocks $t$, which can be placed at any distance from the center of the table G, so as to accommodate any length of specimen required. The cross-head K is made to descend, and being provided with a blunt V-shaped block in place of block $p$, (shown in Fig. IIII,) it exerts a pressure on the specimen, which being supported on table G by the blocks $t$, the strain exerted is transmitted through the weighing-levers to the beam F, there balanced and indicated.

What I claim, and desire to secure by Letters Patent, is—

1. The combination of the levers A B D E and beam F and platform G, in combination with hydraulic jack H, arranged as and for the purpose herein specified.

2. The four screws J and movable cross-head K, in combination with the hydraulic jack H, as and for the purpose herein set forth.

3. The hand-wheel R, shaft S, wheel T, wheel V, idler W, and wheel X, in combination with the screws P and P', as and for the purpose herein set forth.

TINIUS OLSEN.

Witnesses:
I. N. DE HAVEN,
CHAS. ROBSON.